(12) United States Patent
Freisler et al.

(10) Patent No.: US 6,431,600 B1
(45) Date of Patent: Aug. 13, 2002

(54) KNEE RESTRAINT DEVICE FOR VEHICLES

(75) Inventors: Werner Freisler, Königsbronn; Bernd Kleinmann, Schwäbisch Gmünd; Dirk Schultz, Schwäbisch Gmünd; Gerd Zischka, Schwäbisch Gmünd; Klaus Bernhard, Spraitbach; Robert Mohr, Weinstadt, all of (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/553,208

(22) Filed: Apr. 20, 2000

(30) Foreign Application Priority Data

Apr. 22, 1999 (DE) .......................... 299 07 163
Sep. 1, 1999 (DE) .......................... 299 15 365

(51) Int. Cl.⁷ .......................... B60R 21/045
(52) U.S. Cl. .......................... 280/751; 280/752
(58) Field of Search .......................... 280/751, 752, 280/753, 750; 296/70, 192; 248/27.3

(56) References Cited

U.S. PATENT DOCUMENTS

| 3,888,506 | A | * | 6/1975 | Haas .......................... 280/150 |
| 4,518,172 | A | * | 5/1985 | Bortz et al. .................. 280/751 |
| 4,662,649 | A | * | 5/1987 | Ikeda et al. .................. 280/752 |
| 4,709,943 | A | * | 12/1987 | Yoshimura et al. ......... 280/751 |
| 4,721,329 | A | * | 1/1988 | Brantman et al. .......... 280/751 |
| 4,834,422 | A | * | 5/1989 | Oikawa et al. ............. 280/751 |
| 4,978,136 | A | * | 12/1990 | Tomita et al. .............. 280/751 |
| 5,409,260 | A | * | 4/1995 | Reuber et al. .............. 280/753 |
| 5,413,379 | A | * | 5/1995 | Koma ......................... 280/752 |
| 5,630,621 | A | * | 5/1997 | Schneider ................... 280/753 |
| 5,727,288 | A | * | 3/1998 | Byon .......................... 16/254 |
| 5,927,755 | A | * | 7/1999 | Matsuo et al. .............. 280/752 |
| 6,131,950 | A | * | 10/2000 | Schroter ..................... 280/753 |
| 6,186,546 | B1 | * | 2/2001 | Uhl ............................ 280/751 |
| 6,213,504 | B1 | * | 4/2001 | Isano et al. ................. 280/748 |
| 6,213,506 | B1 | * | 4/2001 | Swann et al. ............... 280/751 |
| 6,340,170 | B1 | * | 1/2002 | Davis et al. ............... 280/730.1 |
| 6,345,838 | B1 | * | 2/2002 | Schneider ................. 280/730.1 |

FOREIGN PATENT DOCUMENTS

| DE | 42 04 495 A1 | * | 8/1993 | .......... B60K/37/00 |
| JP | 61-287832 | * | 12/1986 | .......... B60K/37/00 |
| JP | 01141145 | | 6/1989 | |
| JP | 02200547 | | 8/1990 | |
| JP | 06032195 | | 2/1994 | |
| JP | 6-183307 | * | 7/1994 | ......... B60R/21/045 |
| JP | 08175302 | | 7/1996 | |
| JP | 08216816 | | 8/1996 | |

* cited by examiner

*Primary Examiner*—J. J. Swann
*Assistant Examiner*—J. Allen Shriver
(74) *Attorney, Agent, or Firm*—Tarolli, Sundheim, Covell, Tummino & Szabo L.L.P.

(57) ABSTRACT

A knee restraint device for vehicles comprises a base plate and a knee protector part fastened to the base plate. The knee protector part has a load distributor plate with openings and has a covering of plastic. The covering has a rear face facing the load distributor plate and a front face directed in an opposite direction. The covering is provided with pins formed on the rear face and is fastened in a form-fitting manner to the load distributor plate by the pins projecting through the openings in the load distributor plate. The pins have free ends which are shaped such that the free ends project radially outwards and over the openings.

13 Claims, 9 Drawing Sheets

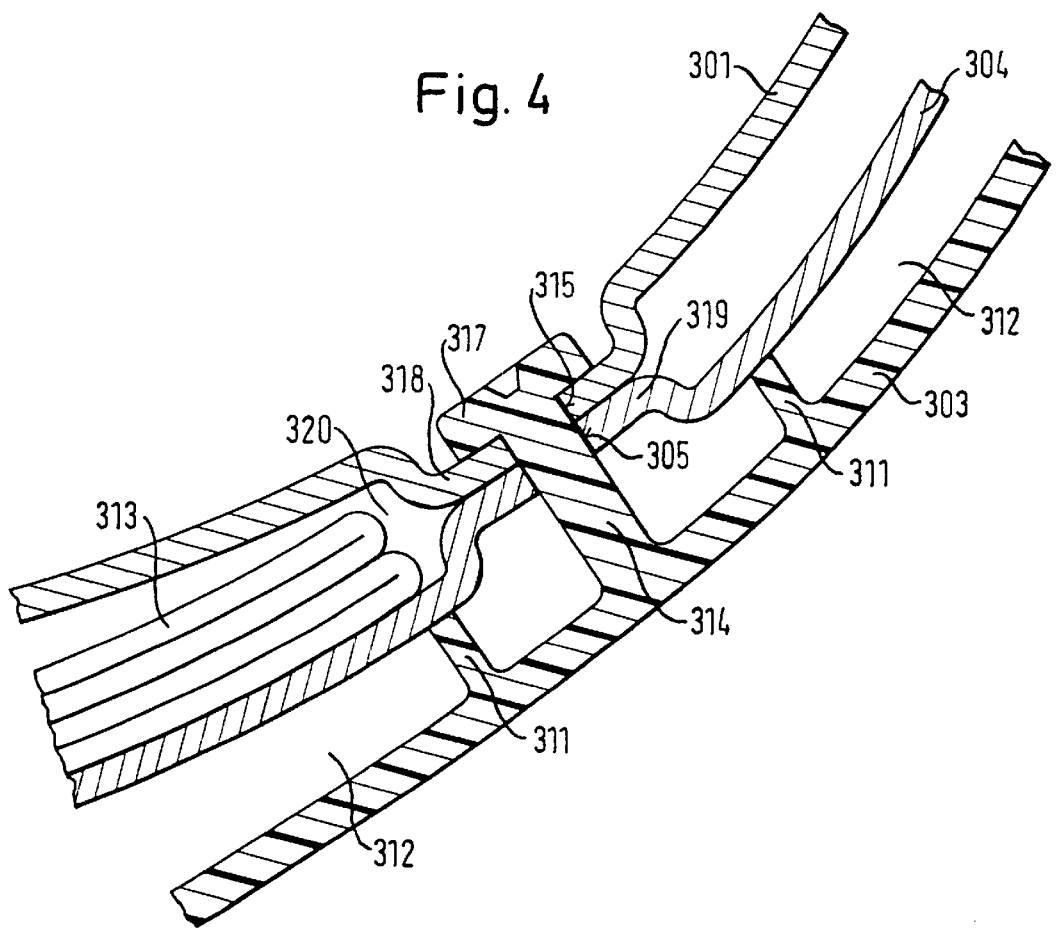

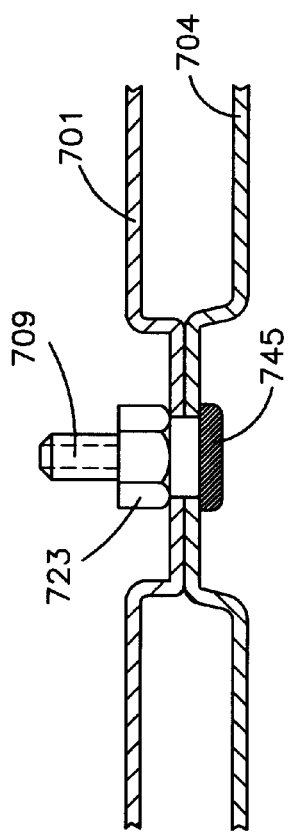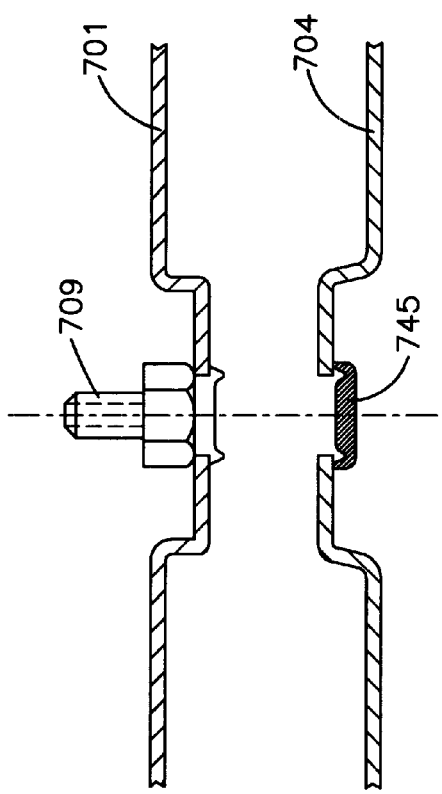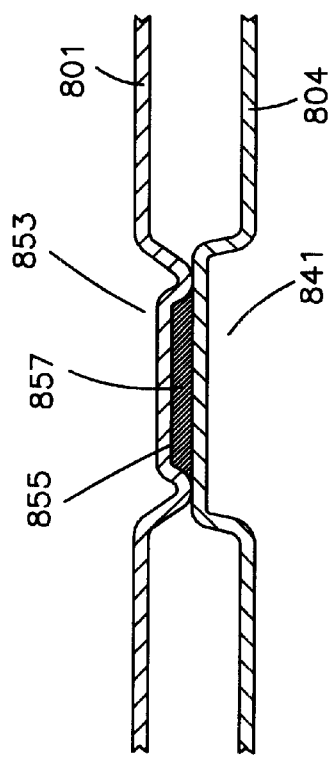

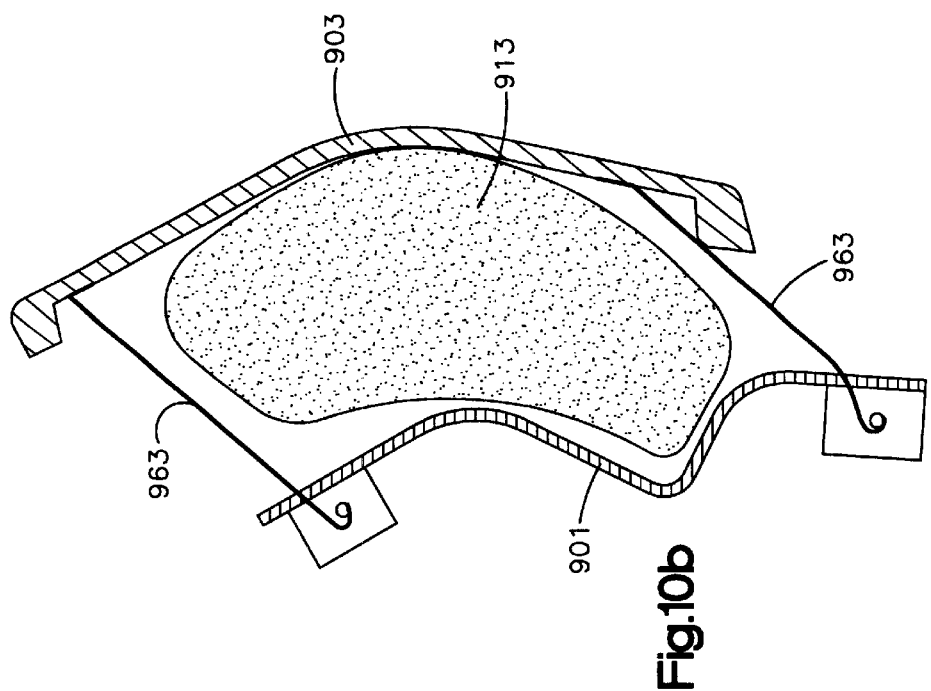
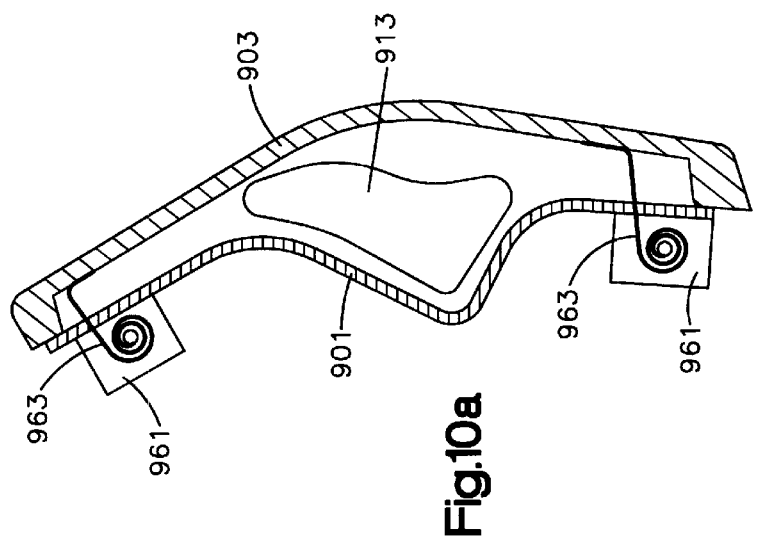

KNEE RESTRAINT DEVICE FOR VEHICLES

TECHNICAL FIELD

The invention relates to a knee restraint device for vehicles.

BACKGROUND OF THE INVENTION

In addition to the known safety restraint devices of airbag and belt, active knee restraint devices are being used increasingly in order to prevent the vehicle occupant from slipping through into the foot well, in particular when the occupant is not wearing his belt or is not occupying an optimum sitting position.

A generic knee restraint device is known from EP 0 872 388 A2. Therein, a knee restraint device is described, in which a knee protector part is moved in the case of restraint by an inflatable airbag toward the knees of the vehicle occupant. The knee protector part consists here of a rigid load distributor plate of metal, which is embedded into an elastic plastic material. The load distributor plate helps the knee protector part to get to the necessary stability and through deformation takes up kinetic energy from the knees of the vehicle occupant, whilst the elastic plastic material serves as padding. The knee protector part is fastened detachably by means of separate fastening pins to the instrument panel or to the base plate of the airbag unit. Through the embedding of the metallic load distributor plate into the elastic plastic material, the various materials can only be separated again with relatively high expenditure during a disposal which is later necessary. The use of separate fastening pins for fastening the knee protector part adds a further material to the assembly and requires furthermore additional expenditure on installation of the knee protector part. As the knee protector part is arranged in the visible area of the instrument panel, the covering must be adapted to the visual appearance of the instrument panel.

The invention is based on the problem of providing a knee restraint device, in which the covering of the knee protector part is connected simply and at a favorable cost with the load distributor plate. With regard to the disposal of old vehicles, required by legislation, an easy separability of the materials which are used is to be provided.

BRIEF SUMMARY OF THE INVENTION

The above-mentioned requirements to be met are fulfilled by the knee restraint device according to the invention which comprises a base plate and a knee protector part fastened to the base plate. The knee protector part has a load distributor plate with openings and has a covering of plastic. The covering has a rear face facing the load distributor plate and a front face directed in an opposite direction. The covering is provided with pins formed on the rear face and is fastened in a form-fitting manner to the load distributor plate by the pins projecting through the openings in the load distributor plate. The pins have free ends which are shaped such that the free ends project radially outwards and over the openings.

Through the fact that the load distributor plate is not encased by the covering, the materials can be separated again later in a simple manner. By the pins being formed on the covering, a unit consisting of pins, i.e. fastening means, and a covering is produced. No separate fastening means is provided, which would accordingly have to be supplied separately during the assembly of the knee protector part and would have to be removed from the knee protector part on recycling. Hence, fewer components and also fewer different materials are provided than in the prior art. Furthermore, the fastening is very simple, because the pins only have to be shaped at their free end, which can take place in a very simple manner by the effects of temperature and/or pressure.

According to a preferred embodiment, the covering is produced from thermoplastic plastic and the pins are shaped under the action of heat. The free end of the pin can have a thickening or can also only be bent, in order to project radially with respect to the openings and project over the openings in the radial direction. The shaping of the free end can take place for example by means of ultrasound. The production of the knee protector part can take place in that firstly the covering and the load distributor plate are produced separately and the covering is subsequently fastened to the load distributor plate, by the pins being inserted through the openings and being shaped at their free ends. Another possibility consists in firstly embedding the load distributor plate by injection,s molding or foaming with a plastic, the pins also being formed by injection-molding or foaming and in so doing being given their final form together with outwardly projecting free ends.

According to the preferred embodiment, the knee restraint device is provided as an active restraint device, by an expansion device between the knee protector part and the base plate moving the knee protector part toward the knees in the case of restraint.

Some of the pins can be passed through openings in the base plate and shaped on the rear face thereof, whereby the knee protector part is fastened to the base plate. By selection of the radius of the pins or the type of plastic material, it can be achieved that the knee protector part detaches itself from the base plate with a force which is largely able to be determined in advance.

According to another embodiment of the invention, openings are provided in the base plate or the load distributor plate, through which fastening elements, arranged on the knee protector part, project, the marginal region of the openings defining radially inwardly projecting tongues and the fastening elements engaging behind the base plate or the load distributor plate at least in a partial region of the marginal region. The marginal region is constructed such that it is deformed in the case of restraint by the fastening elements and the fastening elements detach themselves from the base plate or load distributor plate. Pins formed on the covering could be part of the fastening elements in this embodiment.

Through the use of a metallic load distributor plate and a metallic base plate, the extent of the necessary forces for detaching the knee protector part remains largely independent of temperature and aging, because the mechanical properties are approximately constant in the required temperature ranges.

The types of fastening of the covering on the load distributor plate are independent of the types of fastening of the knee protector part on the base plate. The load distributor plate and the base plate are connected with each other by means of at least one bolt. This connection is destroyed on activation of the expansion device by the force exerted on the knee protector part by the expansion device, for the knee protector part to be able to move toward the knees. Where possible, this destruction of the connection should take place with forces which are able to be exactly determined in advance. Also, no flying individual parts should be produced.

According to one embodiment, the bolt is destroyed on activation of the expansion device; for this purpose, the bolt may be provided with a predetermined breaking site, for example. Furthermore, the bolt may also detach itself from the base plate or the load distributor plate and may remain fastened in the other part.

One embodiment provides that the bolt is a threaded bolt on which a nut is screwed. The bolt and/or the nut are fastened to the load distributor plate or the base plate and may be beaten into, bonded with or, for example, pressed into the respective plate for this purpose. It is further possible to reshape the bolt after fastening, by riveting, upsetting or pressing it so as to obtain a form-fitting connection. The bolt may be a steel bolt or also an aluminum bolt, for example. If a nut is screwed on the screw bolt, the screw bolt may have an increased roughness on the underside of its head, such as in the form of a set of teeth, which prevents rotation of the screw bolt when the nut is screwed on.

According to another embodiment provision is made that the base plate and the load distributor plate are bonded to each other such that the connection is destroyed on activation of the expansion device by the force it exerts on the knee protector part. This bonding connection can be produced for example by means of epoxy resin, an anaerobic adhesive and/or sealing compound, cyanoacrylate, silicone, or, e.g., polyurethane.

The bonding connection permits greater freedom of configuring the geometry of the load distributor plate and the base plate than a form-fit.

BRIEF DESCRIPTION OF THE DRAWINGS

FIG. 4 shows a section through base plate, load distributor plate and covering in the region of a fastening element in accordance with a fourth embodiment;

FIG. 6b shows an enlarged section through the framed region in FIG. 6a;

FIGS. 8a and 8b show enlarged cross-sectional views through the base plate and the load distributor plate in the region of a modified connection, with FIG. 8a showing the two plates in the connected state and FIG. 8b showing the two plates upon activation of the expansion device;

FIG. 9 shows an enlarged cross-sectional view through the base plate and the load distributor plate in the region of a bonded connection; and FIGS. 10a and 10b show diagrammatic cross-sectional views through a further embodiment of the knee restraint device according to the invention, with FIG. 10a showing the device with the expansion device not yet activated and FIG. 10b showing it with the expansion device activated.

DETAILED DESCRIPTION OF THE PREFERRED EMBODIMENTS

Figure 1:
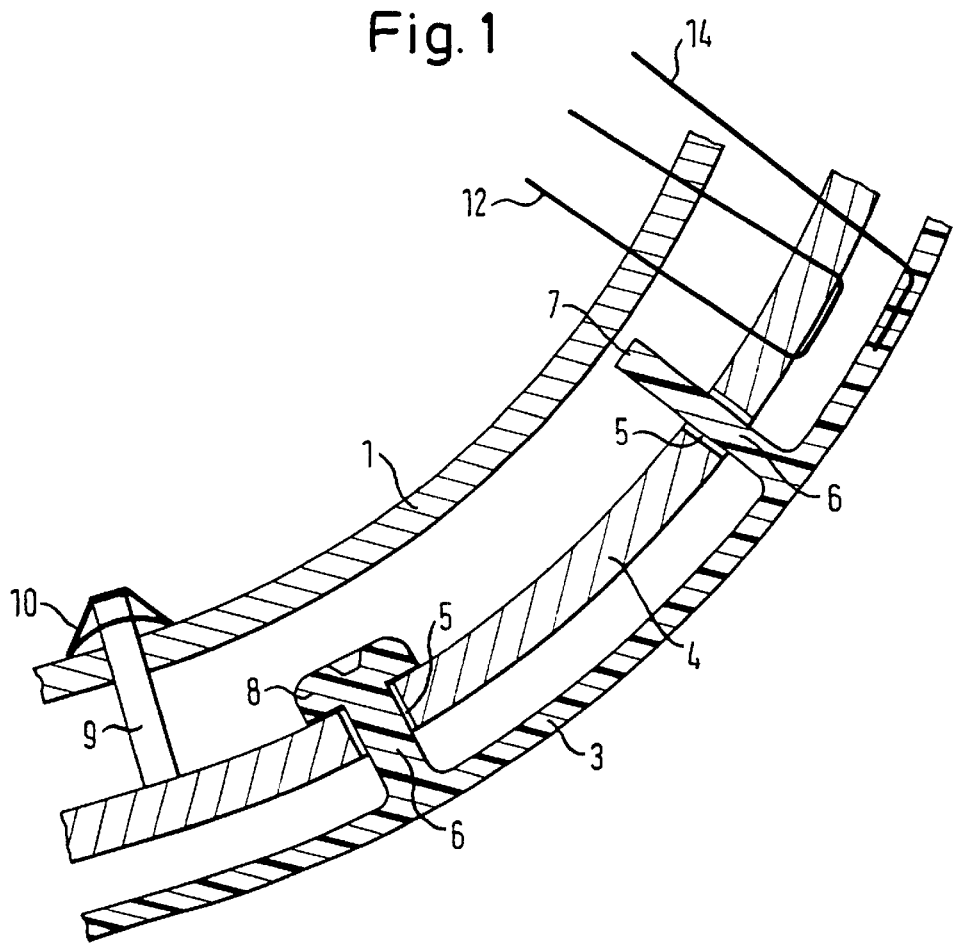
FIG. 1 shows a section through the knee restraint device according to the invention in accordance with a first embodiment.

In FIG. 1 a cross-section is shown through a knee restraint device with a base plate 1 and a knee protector part, which component has a covering 3 of plastic, facing the foot well, and a load distributor plate 4. In the metallic load distributor plate 4, openings 5 are provided. On the inner face of the covering 3, pins 6 are formed on which project through the openings 5. The free ends 7 of the pins 6 are shaped on the rear face of the load distributor plate 4 with the formation of a thickening 8 which projects over the openings in the radial direction. Thereby, the covering 3 is fastened in a form-fitting manner to the load distributor plate 4 without separate components; covering 3 and load distributor plate 4 are separable again without great effort.

The pins 6 can be shaped by methods known per se, for example by ultrasound or, when using a thermoplastic plastic for the covering 3, by the action of heat. The load distributor plate 4 is connected with the base plate 1 by several fastening elements 9. As fastening element 9, a bolt is provided which is welded onto the load distributor plate 4 or is pressed into it. The bolt is secured on the rear face of the base plate 1 by a spring plate or a clip 10. A screw with nut, a plastic insert pin or the like is possible as fastening element in an equivalent manner.

So that the movement of the knee restraint device is specified in a defined manner in the case of restraint, several so-called limiting straps 12 or 14 are provided. The illustrated limiting straps 12 and 14 are examples of the arrangement of limiting straps on the knee protector part. A possibility for the arrangement of a limiting strap is its fastening to the load distributor plate 4. For this, the limiting strap 12 is draw through-slits, not shown explicitly, in the load distributor plate 4, and is fastened by the two free ends on the vehicle side (e.g. on the base plate 1). The limiting strap 12 is constructed as an elastic cable or a wide elastic band. The length of the cable or of the band and its elasticity are selected such that all the provided limiting straps 12 on the one hand limit the maximum distance of movement of the knee protector part and on the other hand can draw the knee protector part back again into its initial position after the displacement. Another possibility for the fastening of limiting straps on the knee protector part is illustrated by the limiting strap 14. This limiting strap, which is again constructed so as to be elastic, and as a band or cable (in either case of plastic), is cast integral with the covering 3. For the optimum embedding of the limiting strap 14 into the covering 3, the limiting strap can be a fabric band for example. Also in this embodiment, all the limiting straps are to be elastic, in order to draw the knee protector part back again into the initial position, after the displacement toward the occupant's knees. The construction of the limiting straps 12, 14 as elastic bands or cables, which draw back the knee protector part, more generally a plate for restraining the occupant's knees into its initial position again after displacement has occurred, is not of course limited to the illustrated and claimed embodiments of the knee protector part. Rather, the described limiting straps 12, 14 can serve quite generally for the positioning of a one-piece or multiple-part knee protector part.

In the further figures, the reference numbers are used, respectively increased by multiples of 100, for the already known structural elements, so that reference can be made to the preceding description.

Figure 2:
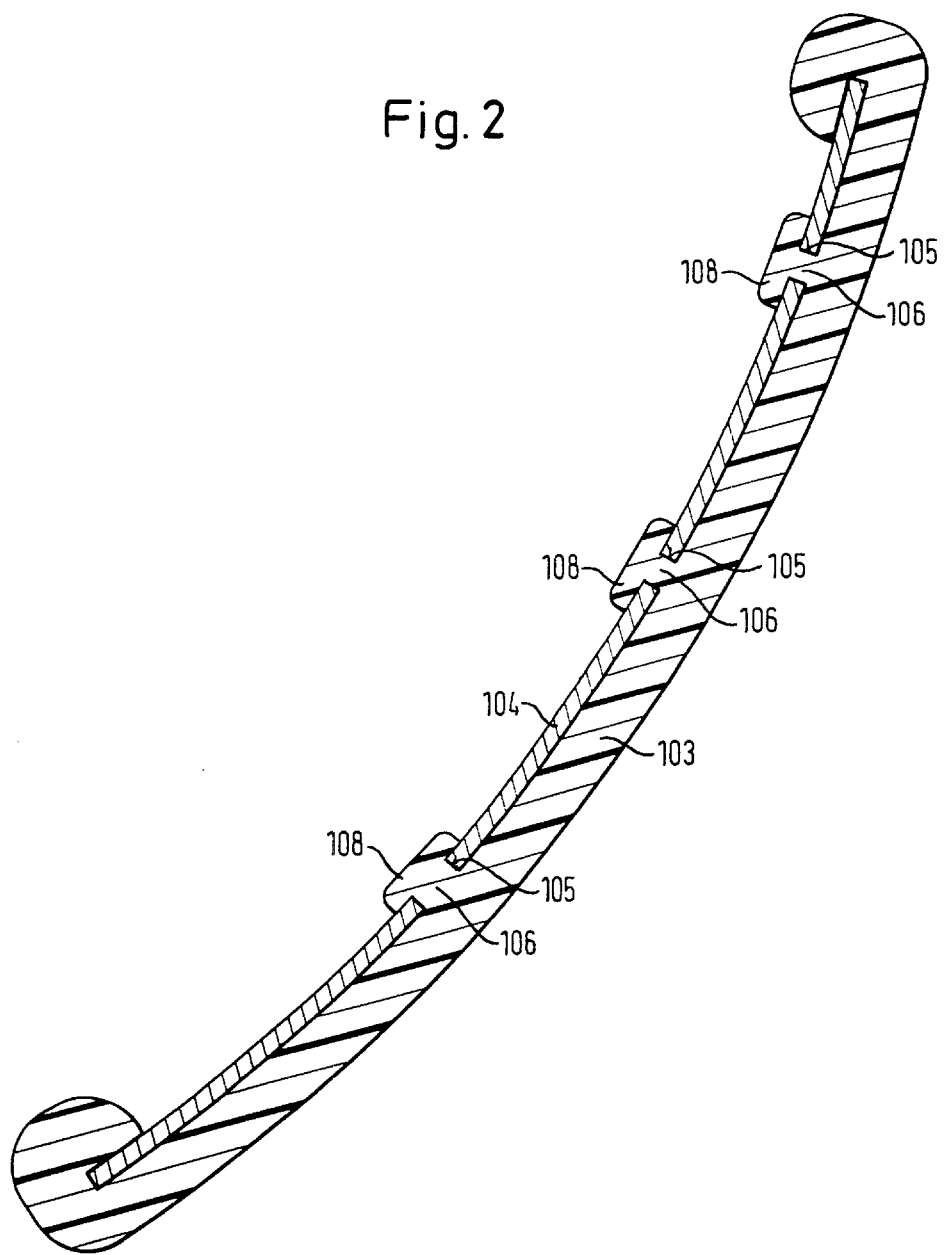
FIG. 2 shows a section through the load distributor plate with covering fastened thereon in accordance with a second embodiment.

FIG. 2 shows a section through a knee protector part according to a second embodiment, a covering 103 being applied on a load distributor plate 104 by foaming or injection-molding. Pins 106 are formed from material of the covering which has passed through the openings 105 on foaming or injection-molding and are shaped on the rear face of the load distributor plate 104 into thickenings 108. The covering 103 can be thus produced in one process step and fastened to the load distributor plate 104. As already described in FIG. 1, the knee protector part can be arranged with fastening elements on the base plate.

Figure 3:
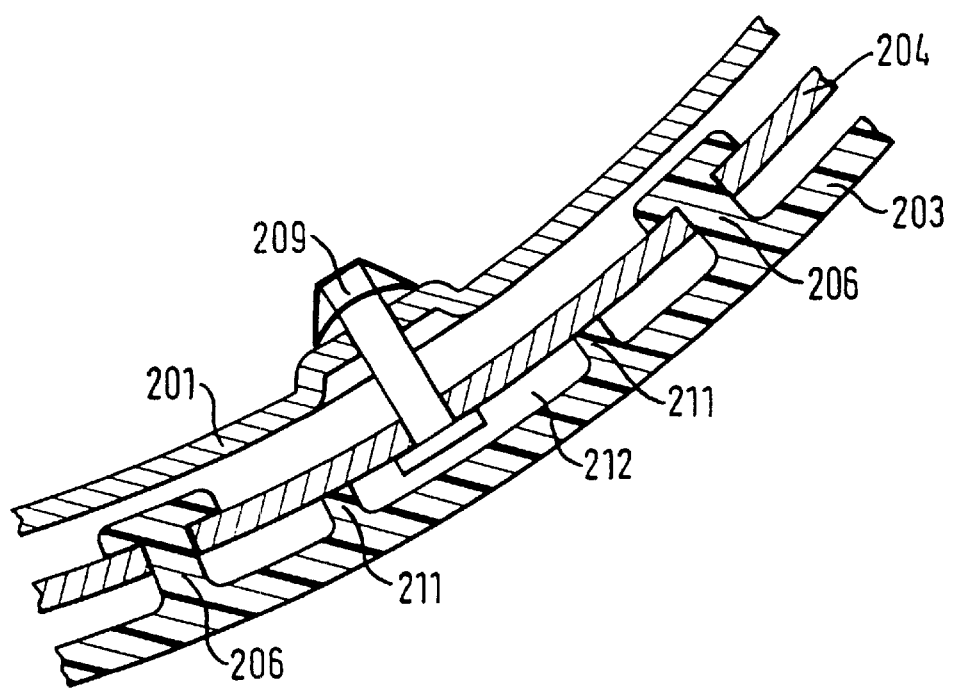
FIG. 3 shows a section through base plate, load distributor plate and covering in the region of a fastening element in accordance with a third embodiment.

FIG. 3 shows a cross-section through a base plate 201 and a knee protector part with covering 203 and load distributor plate 204 according to a third embodiment, the covering 203 being fastened to the load distributor plate 204 by means of the pins 206, as already shown in FIG. 1. On the rear face of the covering 203, additional projections 211 are formed out. With the additional projections 211, the covering 203 rests against the load distributor plate 204, whereby a cavity 212 is formed which leaves space for the head of a fastening element 209, for example a screw or a bolt.

FIG. 4 shows a cross-section through an active knee restraint device according to a fourth embodiment, with an inflatable gas bag 313 arranged between a base plate 301 and a load distributor plate 304. A pin 314 formed onto the covering 303 projects through an opening 305 in the load distributor plate 304 and an opening 315 in the base plate 301. The pin 314 is shaped at its free end into the thickening 317 and thus holds together by form-fitting connection the covering 303, the load distributor plate 304 and the base plate 301 without an additional component. The mode of operation of the gas bag 313 is sufficiently known from the prior art, so that it does not have to be entered into in greater detail at this point. In the case of restraint, the expanding volume of the gas bag 313 exerts a force onto the knee protector part in the direction away from the base plate 301, which force causes a tensile stress in the pin 314 until the pin 314 breaks or the thickening 317 is sheared off and thereby the knee protector part detaches itself from the base plate 301. Through the selection of the diameter and/or of the material of the pin 314, the maximum breaking load, at which the knee protector part detaches itself from the base plate 301, can largely be determined in advance. Also a predetermined breaking point can be provided by the forming of a notch or of a radius on the pin 314.

On the inner face of the covering 303, further projections 311 are formed, which rest on the load distributor plate 304 and hence offer a space 312 for an additional padding between the covering 303 and the load distributor plate 304. In addition, the covering 303 can be fastened additionally in the manner shown in FIG. 1 on the load distributor plate 304.

In the base plate 301, projections are provided in the form of formed-out sections 318, which project toward the load distributor plate 304 and rest on formed-out sections 319 in the load distributor plate 304. Thereby, a cavity 320 is formed between the load distributor plate and the base plate 301 without additional spacer pieces, which cavity 320 serves to receive the folded gas bag 313.

Figure 5A:
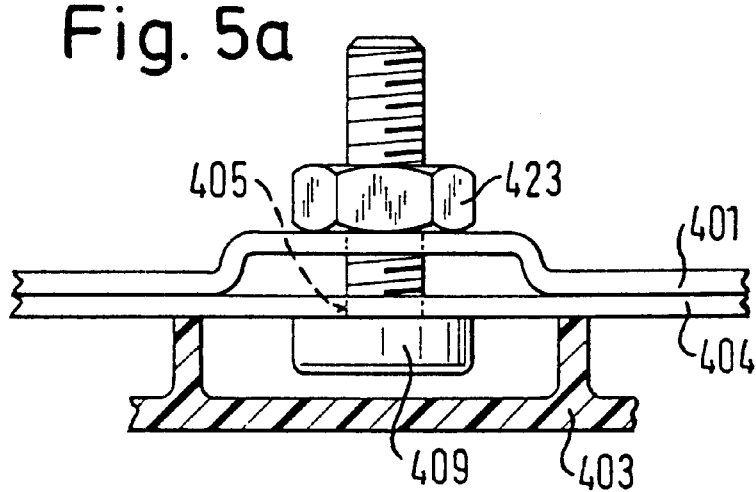
FIG. 5a shows a section through base plate, load distributor plate and covering in the region of a fastening element in accordance with a fifth embodiment.
Figure 5B:
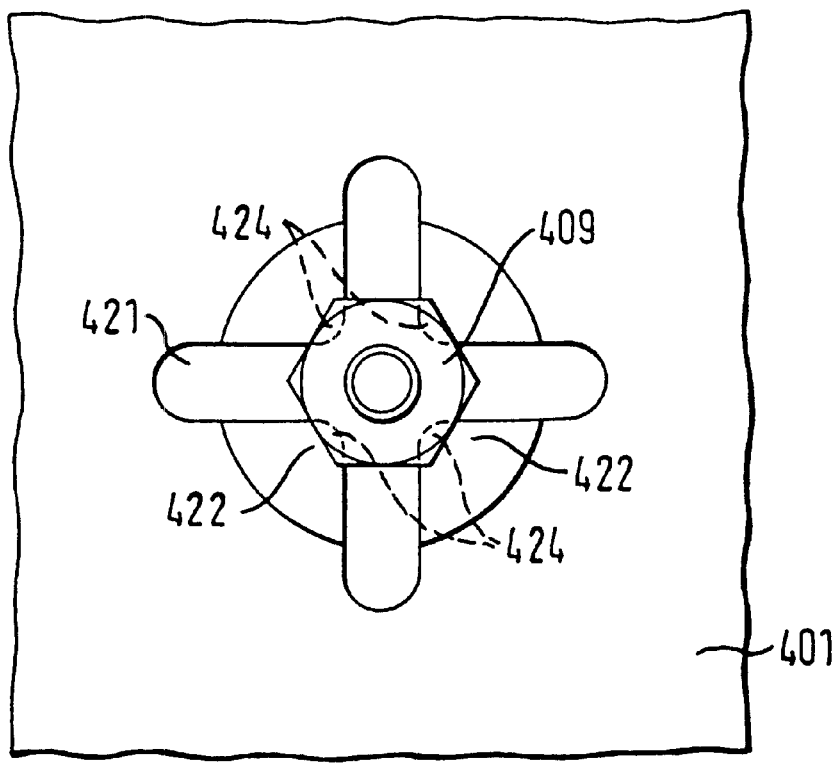
FIG. 5b shows a top view onto the base plate, shown in FIG. 5a, together with fastening device.

In FIGS. 5a and 5b, a fastening is illustrated of a knee protector part on a base plate 401 according to a fifth embodiment. FIG. 5a shows a cross-section through a covering 403, a load distributor plate 404 and the base plate 401 with a fastening element 409. In the base plate 401, in FIG. 5b shown in elevation, an opening 421 is provided, the marginal region of which forms tongues 422 which project radially inwards. The fastening element 409 is for example a screw which is guided through an opening 405 in the load distributor plate 404 and through the opening 421 in the base plate 401 and is secured on the rear face of the base plate 401 by a nut 423. The head of the screw 409 engages behind the load distributor plate 404 in the region of the opening 405, whilst the face of the nut 423 facing the base plate 401 in the regions 424 of the tongues 422 lies thereon. Hence the knee protector part is fastened by means of the load distributor plate 404 on the base plate 401.

Instead of the screw 409, another fastening element, as described in FIG. 1, is also possible, for example a rivet or a bolt welded onto the load distributor plate 404 or inserted into it.

The gas bag 413, expanding in the case of restraint, and which, as described for example in FIG. 4, is arranged between the load distributor plate 404 and the base plate 401, exerts onto the load distributor plate 404 a force directed in a direction away from the base plate 401, which force acts via the screw 409 and the nut 423 onto the tongues 422 and deforms these toward the load distributor plate 404, so that the opening 421 widens and finally frees the nut 423. In this way, the knee protector part with the load distributor plate 404 and the covering 403 detaches itself from the base plate 401, the fastening elements 409 remaining in the load distributor plate 404.

The described mode of operation is maintained when the opening 421 is provided in the load distributor plate 404 instead of in the base plate 401. In this case, the fastening elements 409 remain in the base plate 401 after separation of the knee protector part.

The openings 421 can be produced for example by laser or punching. In the illustrated embodiment, the opening 421 has the form of a cross. However, other shapes are also possible, for example in the form of a star. It is merely essential for the mode of operation that tongues are constructed which can be deformed. The shape of the tongues 422 can be selected depending on the force at which the tongues 422 are to free the fastening element 409. Furthermore, the selection of the strength of the material in which the openings 421 are formed offers play for the extent of the force.

Figure 6B:
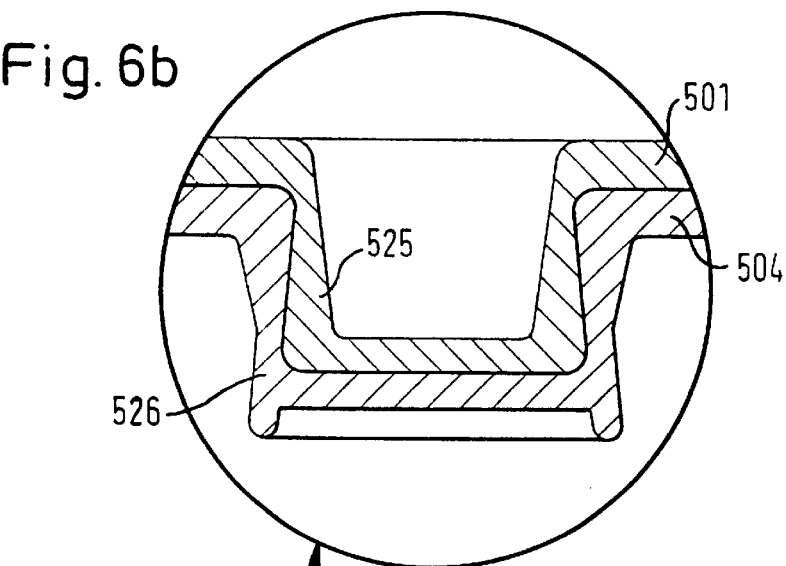
Figure 6A:
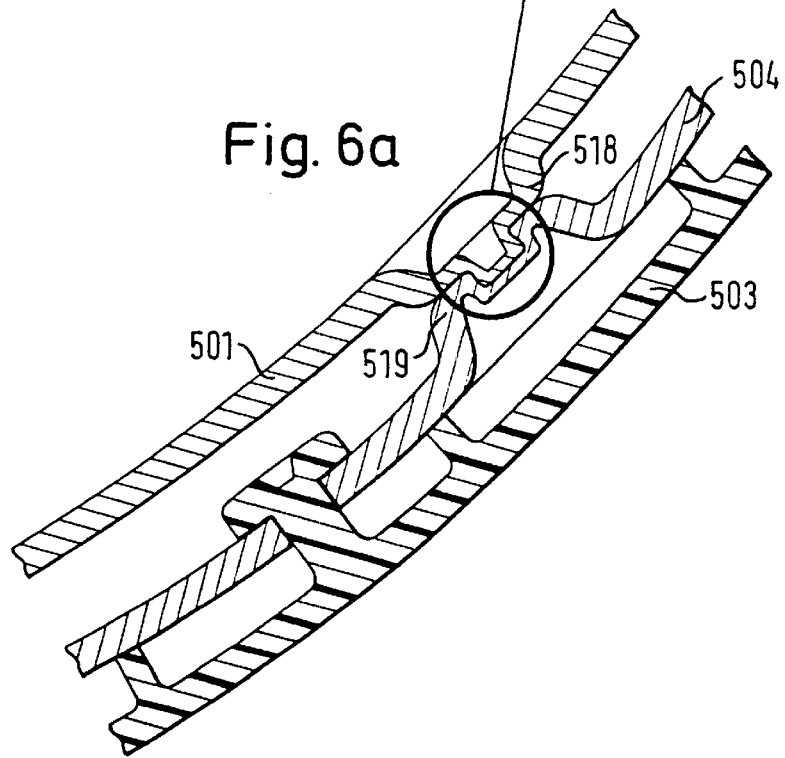
FIG. 6a shows a section through base plate, load distributor plate and covering in the region of a fastening element in accordance with a sixth embodiment.

FIGS. 6a and 6b show a section through a base plate 501 and a knee protector part with a load distributor plate 504 and a covering 503 according to a sixth embodiment, an enlargement of the framed cut-out from FIG. 6a being illustrated in FIG. 6b. In this embodiment, the load distributor plate 504 is fastened by means of the method, known per se, of penetration joining to the base plate 501, and namely in the region of the projections 518 and 519, which were already described in FIG. 4. In penetration joining, sections of load distributor plate 504 and base plate 501 which are touching each other are deformed simultaneously in a press such that cup-like depressions 525, 526 result, the depressions 525 of the base plate 501 engaging in a form-fitting manner into the depressions 526 of the load distributor plate 504 or vice versa. As a result of the slightly conical shape of the depressions 525, 526, a firm connection results, which with an active knee restraint device can be detached again in the case of restraint by the force of the expanding gas bag. Also in this type of fastening, no additional components are necessary.

Figure 7A:
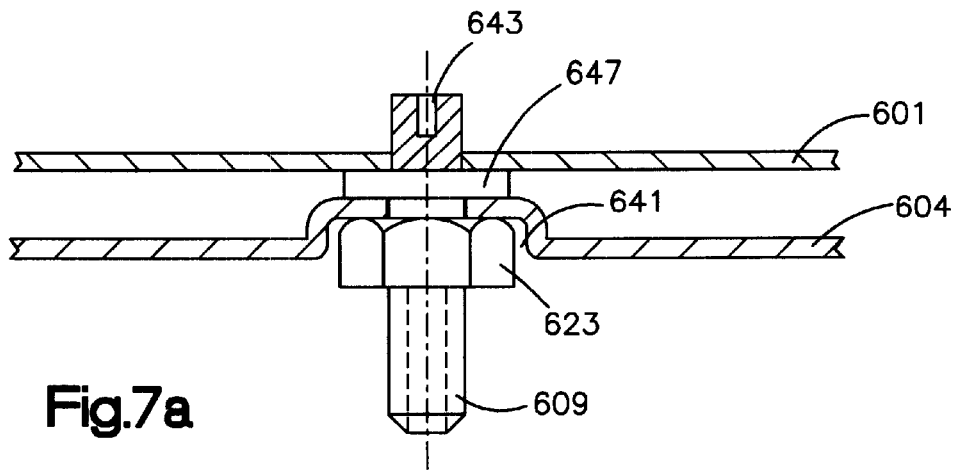
FIGS. 7a to 7c show enlarged cross-sectional views through the base plate and the load distributor plate, illustrating the fastening thereof in accordance with a preferred embodiment, with FIG. 7a showing the fastening means prior to connection, FIG. 7b showing the fastening means in the connected state, and FIG. 7c showing the fastening means upon activation of the expansion device.
Figure 7B:
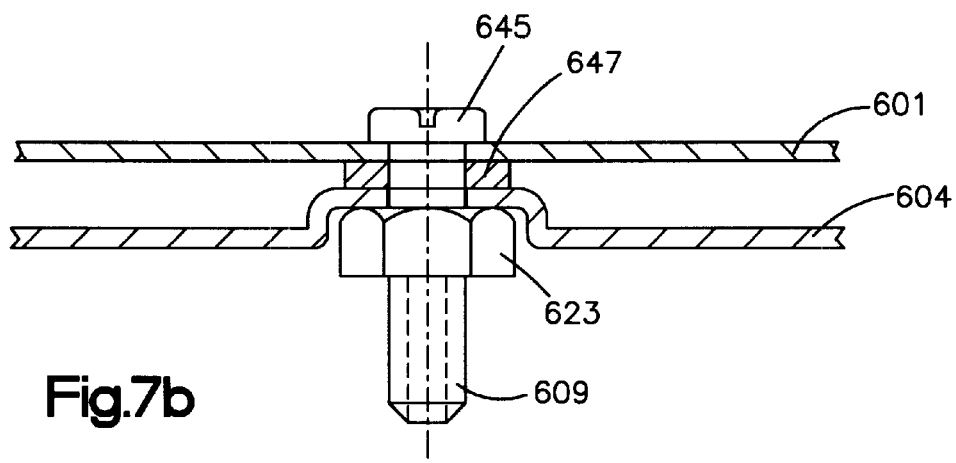
Figure 7C:
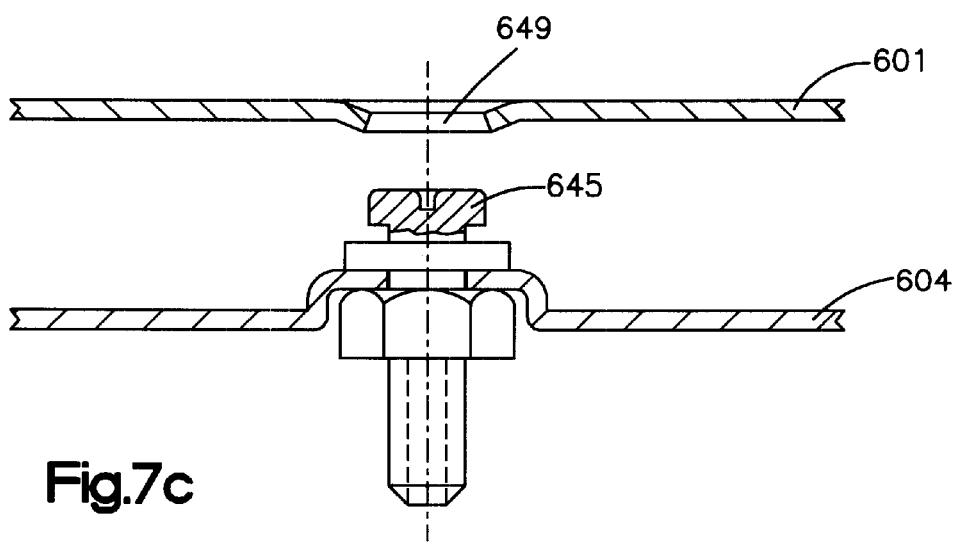

FIG. 7a illustrates those regions of the base plate 601 and the load distributor plate 604 in which these two plates are connected with each other, with a plurality of such fastening points being provided. The load distributor plate has a depression 641 which serves as a spacer between the two plates and for receiving a nut 623. A threaded bolt 609 is screwed into the nut. One end of the threaded bolt 609 projects through a bore in the base plate 601, this end having a slot 643 for a screwdriver. In FIG. 7a the base plate 601 and the load distributor plate 604 are not yet fastened to each other in a form-fitting manner. After the threaded bolt 609 has been passed through the opening in the base plate 601, the end of the screw bolt 609 which protrudes through the opening is reshaped so that a head 645 results as is illustrated in FIG. 7b. In this condition, the base plate 601 and the load distributor plate 604 are connected with each other. A spacer washer 647 lies between the two plates. As soon as the expansion device in the form of the gas bag, not illustrated in this view, is activated, a force of such magnitude is exerted on the load distributor plate 604 that the edge of the opening 649 (see FIG. 7c) in the base plate 601 is deformed plastically or torn, which causes the head 645 to slip through the opening 649 and the load distributor plate 604 to be moved toward the knees of the occupant. The connection is thus destroyed. Alternatively, the nut 623 may be omitted, and the bolt 609 is screwed into either of the two plates 601, 604 or is reshaped on one side similar to a rivet. In order to avoid parts being flung away, the head 645 or the nut 623 may be secured to the respective plate 601 or 604, e.g. by bonding.

In the embodiment according to FIG. 8a the threaded bolt 709 is passed through the two plates 701 and 704, something which may be performed by beating in or pressing in, for example. The head 745 of the bolt has on its lower side which rests against the load distributor plate 704, a set of teeth which is to counteract a turning of the bolt 709 when the nut 723 is screwed on. Use of a bolt, in particular of metal, has the advantage that the force for detaching the knee protector part is hardly temperature-dependent.

When the gas bag (not shown) is inflated, the bolt 709 breaks off below its head at a specified predetermined breaking site so that the plates 701 and 704 can move away from each other.

In the embodiment according to FIG. 9 the base plate 801 and the load distributor plate 604 each have depressions 853 and 841, respectively, with the reshaped wall parts of the two plates 801, 804 coming to lie one on the other and a spacer being formed. The bottom section 855 in the plate 804 in the region of the depression 853 is reshaped outwards for a cavity to form between the two plates which is tilled with adhesive 857. The two plates 801, 804 are glued to each other. Some variants for an adhesive have already been named above. The bonded joint will become detached upon deployment of the gas bag. In this and also in the other embodiments, the load distributor plate and/or the base plate may moreover be made of plastic. It is furthermore possible to realize a combination of the different variants of fastening the load distributor plate to the base plate.

The embodiment according to FIG. 10a shows that the base plate 901 and the load distributor plate 903 are connected to each other by a plurality of damping devices 961 provided at the ends of the two plates. The damping devices 961 consist of rolled-up metal bands 963 which uncoil during deployment of the gas bag 913 (cf. FIG. 10b). By means of the metal bands 963 the plates 901 and 903 are kept spaced apart even after the gas bag has collapsed. In the case of a secondary impact the knee protector part will then again serve as a means of restraint. When the knees hit the knee protector part, a force is applied into the knee protector part toward the initial position of the knee protector part (FIG. 10a) and the metal bands 963 are deformed plastically.

It will be appreciated that while the attachment of the load distributor plate to the covering and the attachment of the knee protector part to the base plate are illustrated in a combination in the present application, the attachment of the knee protector part to the base plate may also be employed independently of the type of attachment of the load distributor plate and the covering.

What is claimed is:

1. A knee restraint device for vehicles, comprising a base plate and a knee protector part fastened to said base plate, said knee protector part having a load distributor plate and a covering of plastic, said load distributor plate having openings, said covering having a rear face facing said load distributor plate and a front face directed in an opposite direction, said covering being provided with pins formed on said rear face and being fastened in a form-fitting manner to said load distributor plate by said pins projecting through said openings in said load distributor plate, and said pins having free ends which are shaped such that said free ends project radially outwards and over said openings, an expansion device being provided between said knee protector part and said base plate, said device moving said knee protector part toward said knees in a case of restraint, fastening elements arranged on said knee protector part and openings in said base plate being provided through which openings said fastening elements project, said openings having a marginal region which defines tongues projecting radially inwards, said fastening elements engaging behind said base plate at least in a partial region of said marginal region, said marginal region being constructed such that it is deformed in said case of restraint by said fastening elements and that said fastening elements detach themselves from said base plate.

2. The knee restraint device according to claim 1, wherein a fastening of said knee protector part on said base plate takes place in that said base plate and said load distributor plate are connected with each other by means of penetration joining.

3. The knee restraint device according to claim 1, wherein said fastening means has a widened, formed-on end which is arranged between said covering and said load distributor plate and is fastened to said knee protector part.

4. A knee restraint device for vehicles, comprising a base plate and a knee protector part fastened to said base plate, said knee protector part having a load distributor plate and a covering of plastic, said load distributor plate having openings, said covering having a rear face facing said load distributor plate and a front face directed in an opposite direction, said covering being provided with pins formed on said rear face and being fastened in a form-fitting manner to said load distributor plate by said pins projecting through said openings in said load distributor plate, and said pins having free ends which are shaped such that said free ends project radially outwards and over said openings, an expansion device being provided between said knee protector part and said base plate, said device moving said knee protector part toward said knees in a case of restraint, fastening elements arranged on said distributor plate and openings in said base plate being provided through which openings said fastening elements project, said openings having a marginal region which defines tongues projecting radially inwards, said fastening elements engaging behind said base plate at least in a partial region of said marginal region, said marginal region being constructed such that it is deformed in said case of restraint by said fastening elements and that said fastening elements detach themselves from said base plate.

5. The knee restraint device according to claim 4, wherein said fastening means has a widened, formed-on end which is arranged between said covering and said load distributor plate and is fastened to said knee protector part.

6. A knee restraint device for vehicles, comprising a base plate and a knee protector part fastened to said base plate, said knee protector part having a load distributor plate and a covering of plastic, said load distributor plate having openings, said covering having a rear face facing said load distributor plate and a front face directed in an opposite direction, said covering being provided with pins formed on said rear face and being fastened in a form-fitting manner to said load distributor plate by said pins projecting through said openings in said load distributor plate, and said pins having free ends which are shaped such that said free ends project radially outwards and over said openings, an expansion device being provided between said knee protector part and said base plate, said device moving said knee protector part toward said knees in a case of restraint, at least one bolt being provided and said load distributor plate and said base plate being connected with each other by means of said at least one bolt, said connection being destroyed by a force exerted on said knee protector part on activation of said expansion device.

7. The knee restraint device according to claim 6, wherein said bolt is destroyed upon activation of said expansion device.

8. The knee restraint device according to claim 6, wherein said bolt detaches itself from one of said base plate and said load distributor plate upon activation of said expansion device.

9. The knee restraint device according to claim 6, wherein said bolt is a threaded bolt onto which a nut is screwed.

10. A knee restraint device for vehicles, comprising a base plate and a knee protector part fastened to said base plate, said knee protector part having a load distributor plate and a covering of plastic, said load distributor plate having openings, said covering having a rear face facing said load distributor plate and a front face directed in an opposite direction, said covering being provided with pins formed on said rear face and being fastened in a form-fitting manner to said load distributor plate by said pins projecting through said openings in said load distributor plate, and said pins having free ends which are shaped such that said free ends project radially outwards and over said openings, projections being provided on said load distributor plate and on at least one of said base plate and said covering, said projections servings as spacers.

11. The knee restraint device according to claim 10, wherein said load distributor plate is fastened to said base plate in a region of said projections.

12. A knee restraint device for vehicles, comprising a base plate and a knee protector part fastened to said base plate, said knee protector part having a load distributor plate and a covering of plastic, said load distributor plate having openings, said covering having a rear face facing said load distributor plate and a front face directed in an opposite direction, said covering being provided with pins formed on said rear face and being fastened in a form-fitting manner to said load distributor plate by said pins projecting through said openings in said load distributor plate, and said pins having free ends which are shaped such that said free ends project radially outwards and over said openings, an expansion device being provided between said knee protector part and said base plate, said device moving said knee protector part toward said knees in a case of restraint, at least one damping device being provided between said knee protector part and said base plate which, after said expansion device has been activated and said knee protector part has moved away from said base plate, resists a force directed into said knee protector part toward an initial position of said knee protector part and is deformed by said force.

13. The knee restraint device according to claim 12, wherein said damping device includes metal bands between said base plate and said knee protector part.

* * * * *